United States Patent
Schamberg et al.

(10) Patent No.: US 9,616,599 B2
(45) Date of Patent: Apr. 11, 2017

(54) METHOD FOR THE CONTINUOUS PRODUCTION OF AN ENDLESS STRING OF POLYURETHANE REACTIVE PLASTIC MATERIAL

(71) Applicant: Hennecke GmbH, Sankt Augustin (DE)

(72) Inventors: Martin Schamberg, Sankt Augustin (DE); Martin Krupp, Hennef (DE)

(73) Assignee: HENNECKE GMBH, Sankt Augustin (DE)

( * ) Notice: Subject to any disclaimer, the term of this patent is extended or adjusted under 35 U.S.C. 154(b) by 326 days.

(21) Appl. No.: 14/487,443

(22) Filed: Sep. 16, 2014

(65) Prior Publication Data

US 2015/0076749 A1 Mar. 19, 2015

(30) Foreign Application Priority Data

Sep. 17, 2013 (DE) .................. 10 2013 015 321

(51) Int. Cl.
- *B29C 41/28* (2006.01)
- *B29C 41/00* (2006.01)
- *B29C 41/50* (2006.01)
- *B29C 44/28* (2006.01)
- *B29K 75/00* (2006.01)
- *B29L 7/00* (2006.01)

(52) U.S. Cl.
CPC ............ *B29C 41/28* (2013.01); *B29C 41/003* (2013.01); *B29C 41/50* (2013.01); *B29C 44/28* (2013.01); *B29K 2075/00* (2013.01); *B29L 2007/008* (2013.01)

(58) Field of Classification Search
None
See application file for complete search history.

(56) References Cited

U.S. PATENT DOCUMENTS

| | | | |
|---|---|---|---|
| 3,152,361 | A | 10/1964 | Edwards |
| 6,845,602 | B2 | 1/2005 | Drut |
| 7,968,023 | B2 | 6/2011 | Wirth et al. |

FOREIGN PATENT DOCUMENTS

| | | |
|---|---|---|
| DE | 2142450 A1 | 3/1972 |
| DE | 2434938 A1 | 2/1975 |

(Continued)

OTHER PUBLICATIONS

European Search Report dated Feb. 27, 2015 (no English language translation).

*Primary Examiner* — Monica Huson
(74) *Attorney, Agent, or Firm* — Lucas & Mercanti, LLP

(57) ABSTRACT

A method for continuous production of an endless string of polyurethane reactive plastic material including, a) conveying the reactive components to a mixer in a metered manner, b) mixing the reactive components into a reactive mixture, c) subsequently discharging the reactive mixture and d) coating a first sheet section made from a plane, flexible material which is conveyed continuously in a transporting direction with the reactive mixture. Further including: e) guiding the first sheet section across a guiding element, which has a concave section and a flat section which follows the concave section in the transporting direction; f) feeding two lateral sheet sections to the first sheet section, wherein the feeding occurs into the two lateral end sections of the first sheet section; g) merging the two lateral sheet sections and the first sheet section so that a bowl-shaped structure is formed for reception of the reactive mixture.

12 Claims, 5 Drawing Sheets

(56) References Cited

FOREIGN PATENT DOCUMENTS

| DE | 2650704 A1 | 5/1977 |
|---|---|---|
| DE | 10032551 A1 | 1/2002 |
| DE | 102006051311 A1 | 5/2008 |

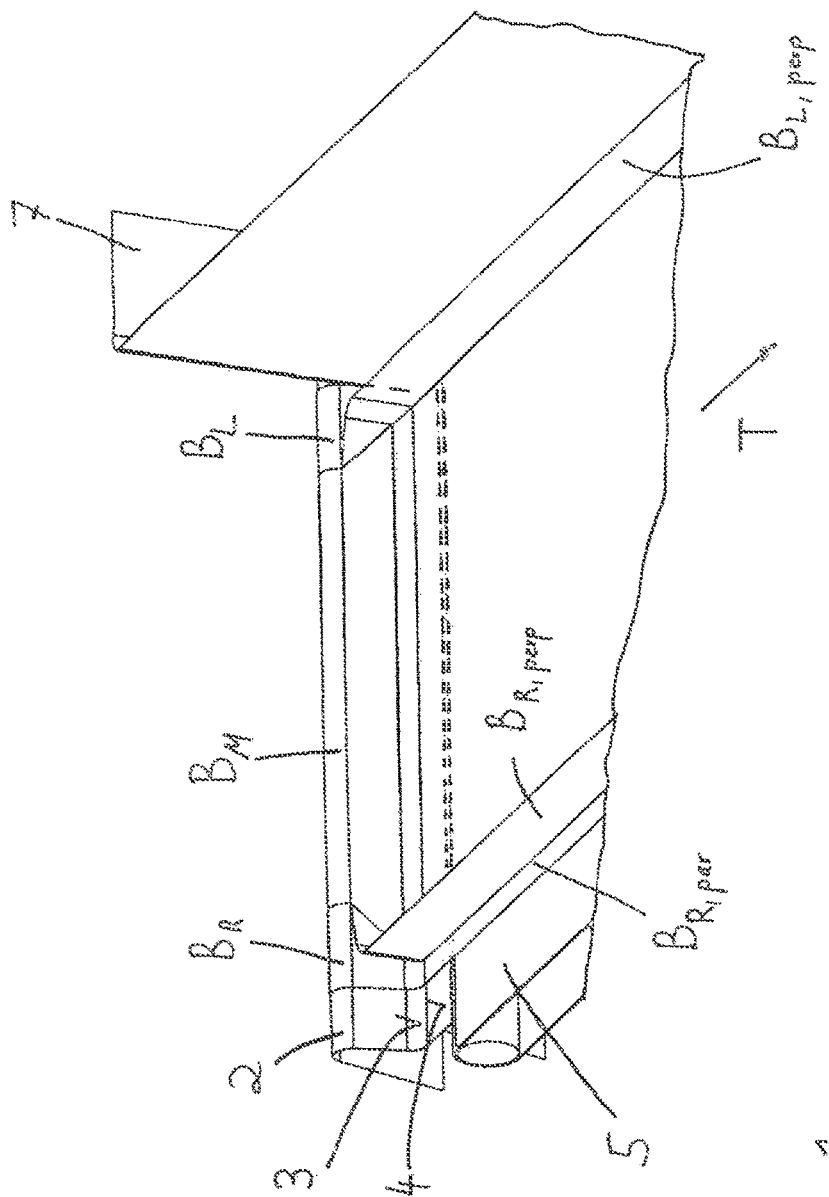

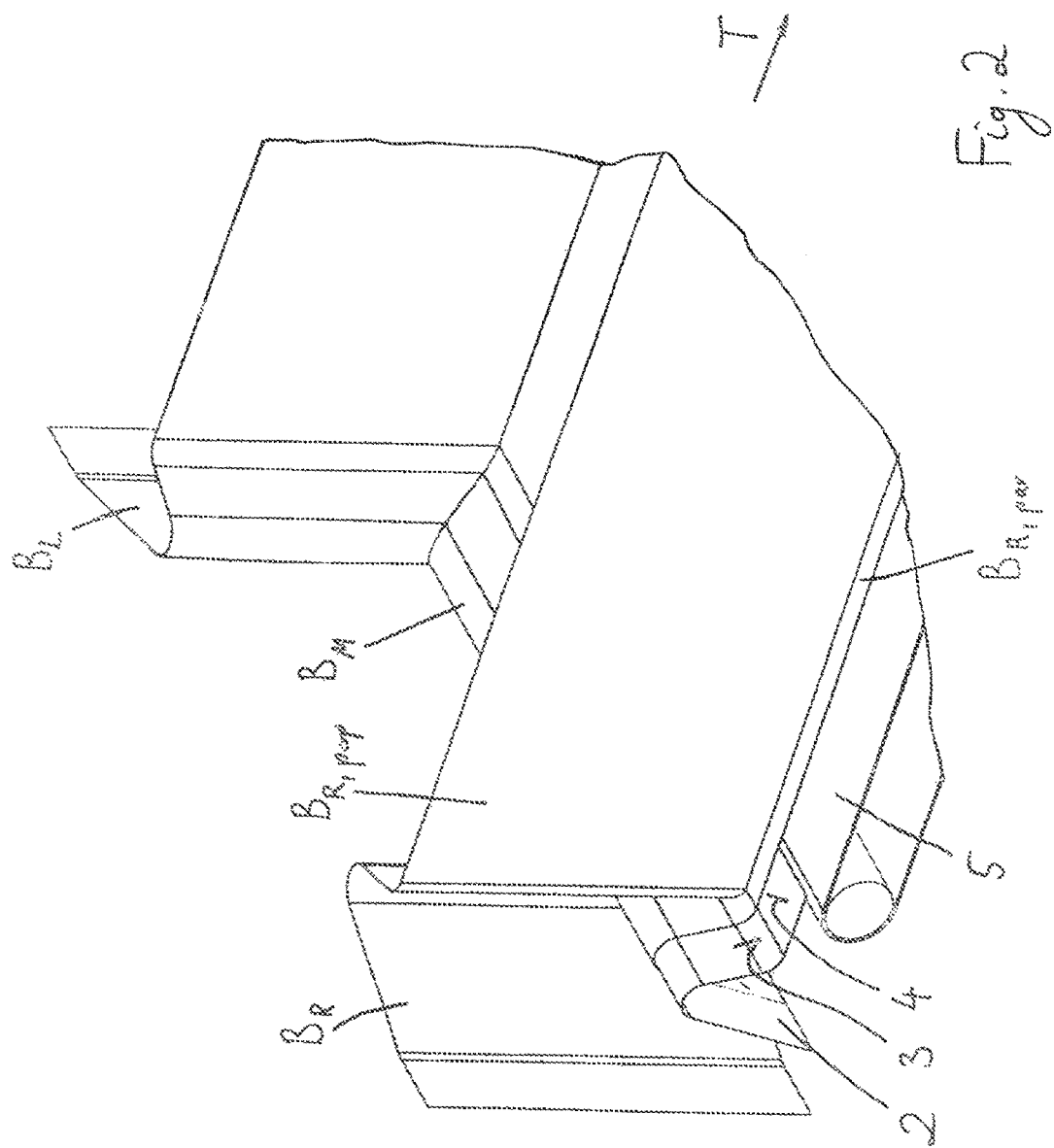

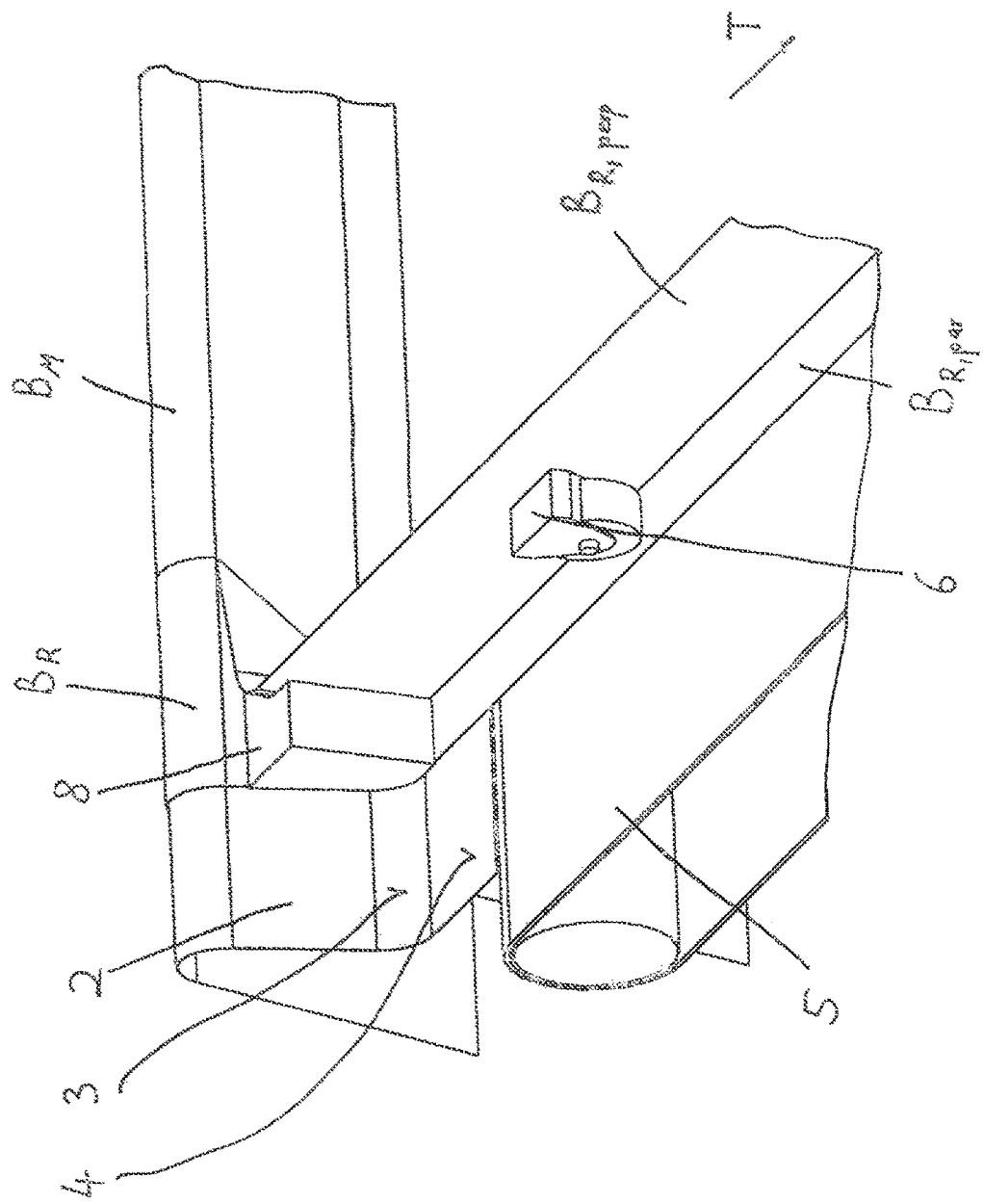

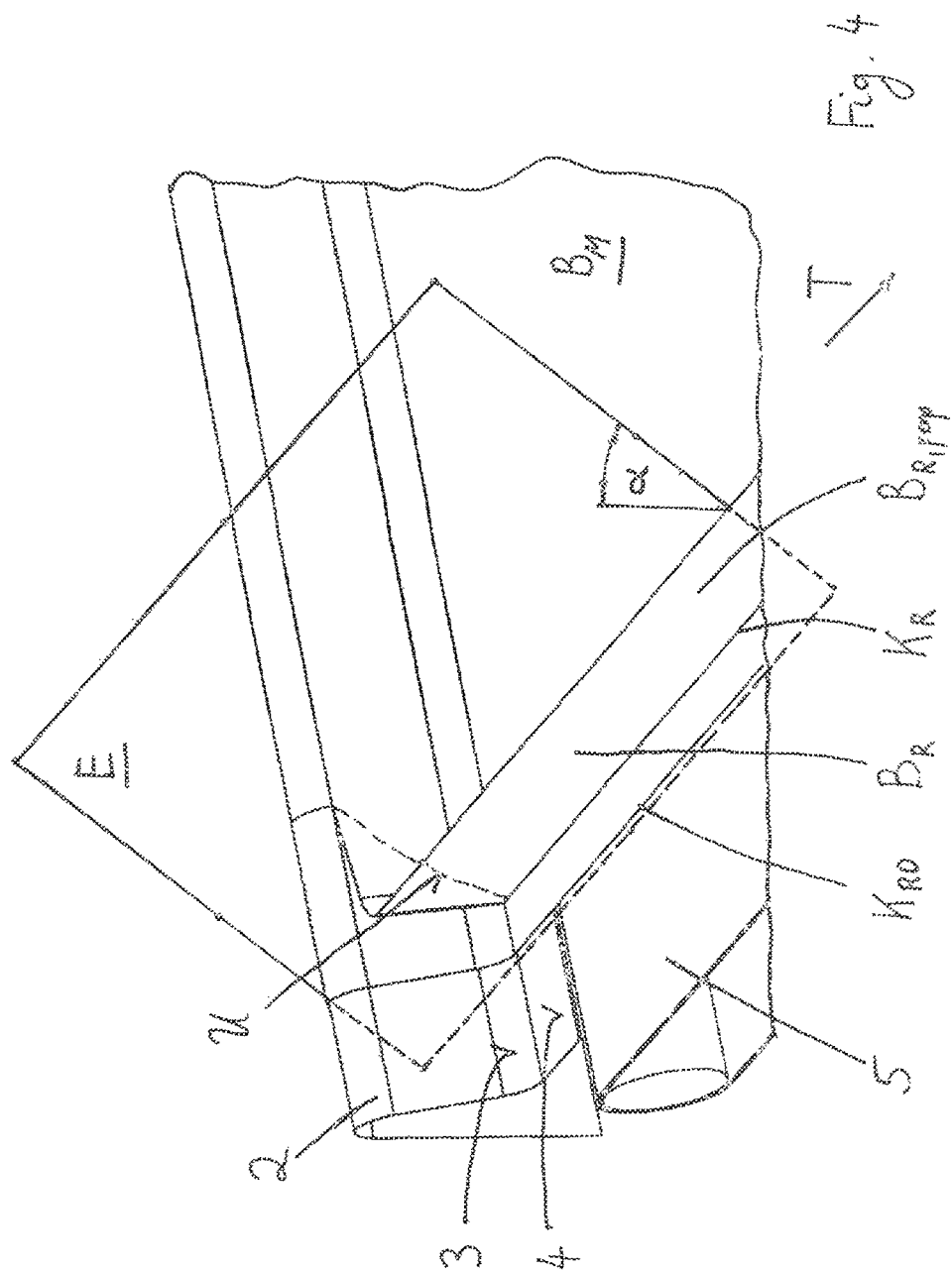

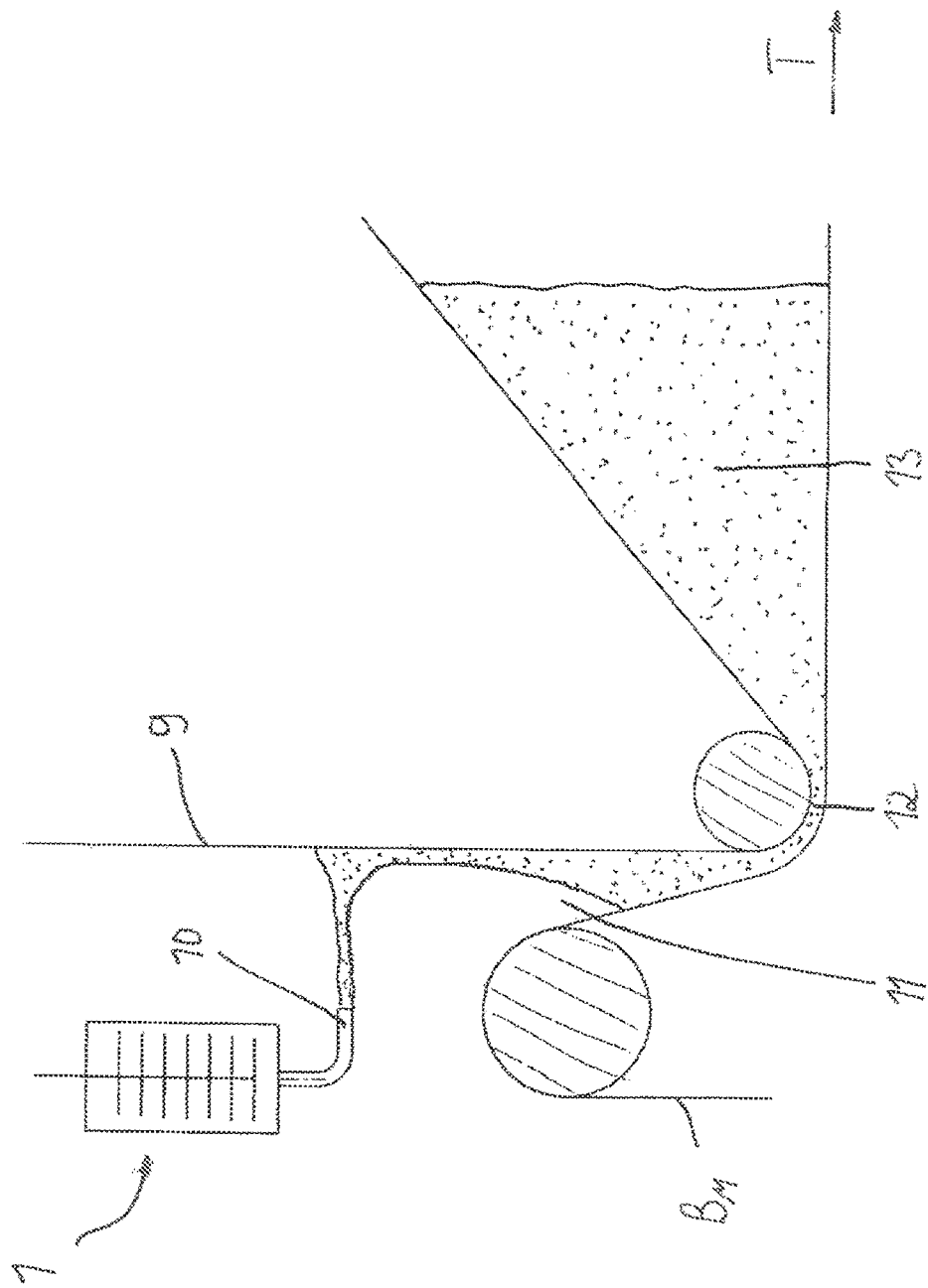

METHOD FOR THE CONTINUOUS PRODUCTION OF AN ENDLESS STRING OF POLYURETHANE REACTIVE PLASTIC MATERIAL

CROSS-REFERENCE TO RELATED APPLICATIONS

The present application claims priority of DE 10 2013 015 321.2, filed Sep. 17, 2013, the priority of this application is hereby claimed and this application is incorporated herein by reference.

BACKGROUND OF THE INVENTION

The invention relates to a method for the continuous production of an endless string of polyurethane reactive plastic material,
  a) at which at first the reactive components polyol and isocyanate are conveyed to a mixer in a metered manner,
  b) at which then the reactive components are mixed in the mixer to a reactive mixture,
  c) which subsequently the reactive mixture is discharged into the environmental atmosphere and
  d) at which a first sheet section made from a plane, flexible material, especially a paper, foil or textile sheet, which is conveyed continuously into a transporting direction is coated with the reactive mixture.

A method according to the generic kind is disclosed in DE 2006 051 311 A1. This method can be used for different applications, for example for the production of flexible soft bloc foam, of closed-cellular hard block foam, of isolation panels and of half-finished products made from thermoplastic polyurethane. This method can be carried out with a plurality of facilities with different facility concepts. Continuously working bloc foam facilities for flexible foam systems as well as for hard foam systems are examples of such facilities.

Furthermore, the present invention relates also to facilities for the continuous production of sandwich panels or isolation panels on so-called double panel belt systems.

An object which recurs always again at those facilities respectively at the corresponding methods is the optimized application of the reactive mixture onto the substrate which protects the components of the device from pollution with reactive mixture. With respect to the application technique different aspects have to be considered hereby:

At first no air bubbles should be brought into the reactive mixture.

Furthermore, the application technique must ensure a distribution of the reactive mixture along the whole production width (width of the substrate).

Hereby, also an age distribution of the reactive mixture which is as homogeneous as possible along the production width should be ensured.

After the reactive mixture is discharged into the environment atmosphere possibly no stationary device components should be bathed with reactive mixture due to the fact that the reactive mixture is normally a material with good adhesive properties to so ensure a long and reliable production of the device.

SUMMARY OF THE INVENTION

Thus, it is an object of the invention to further develop a method of the generic kind so that the mentioned aspects can be realized in an improved manner, compared with the pre-known measures.

The solution of this object by the invention is characterized in that the method further comprises the steps:
  e) Guiding of the first sheet section across a guiding element, which has a concave formed section and a flat section which follows the concave formed section in transporting direction;
  f) Feeding of two lateral sheet sections to the first sheet section, wherein the feeding occurs into the two lateral end sections (edge sections) of the first sheet section;
  g) Merging of the two lateral sheet sections and the first sheet section so that a bowl-shaped structure is formed for the reception of the reactive mixture which is moved continuously in transporting direction, wherein the first sheet section is connected with the lateral sheet sections in such a sealed manner so that no reactive mixture can leak into the surrounding atmosphere between the sheet sections.

The merging of the two lateral sheet sections to the first sheet section occurs thereby preferably in the region of the concave formed section of the guiding element.

A specifically preferred embodiment of the invention proposes that the first sheet section and the two lateral sheet sections are formed by folding of a single sheet section made of a plane, flexible material. Specifically, it has been proven for this solution when the method further comprises the steps
  h) Unwinding of a plane sheet of the material from a roll;
  i) Carrying out of a first and a second folding of the plane sheet at which the two lateral outer sections of the sheet are folded to the inner side by 180° so that a C-folding is created with a first fold edge between the first sheet section and one of the lateral sheet sections and with a second fold edge between the first sheet section and the other lateral sheet section;
  j) Guiding of the sheet which is performed with the C-folding across the concave formed section of the guiding element;
  k) Edging of the two lateral sheet sections which are folded to the inner side in the region of the concave formed section so that at least the outer sections of the lateral sheet sections which are at first folded to the inner side by 180° are further folded in that manner that at least the outer sections of those lateral sheet sections are erected vertically to the first sheet section to form the bowl-shaped structure for the reception of the reactive mixture together with the first sheet section.

A central region and two outer lateral regions are thereby formed from a single material sheet.

The continuous production of a C-folding can be carried out by so-called form collars (insofar explicitly reference is made to DE 100 32 551 A1 where the C-folding represents a simplified special case of the method which is described there).

Preferably, the lateral sheet sections after deforming according to above step k) are thereby formed in the region of the concave formed section in the region of the flat section of the guiding element in such a manner that each one of the sheet sections is aligned perpendicular to the first sheet section while a respective further sheet section is aligned parallel to the first sheet section.

Preferably, the by means of the laterally sheet sections laterally delimited bowl becomes wider when advancing in transporting direction in the region of the concave formed section. By doing so it is prevented that regions develop outside in which the reactive mixture pauses too long by which the reactive mixture would foam too early in the outer region. To the contrary, in the case of a folding method in which the bowl would become smaller in this region in transporting direction a fluidic dead zone would be created in the reducing edge region in transporting direction in which the reactive mixture would foam early.

The geometrical position of the deformation edge for the deformation of the C-folding according to above step i) into the edged position according to above step k) in the region of the concave formed section results preferably as the geometrical section of two areas, wherein one of the areas is an area which is arranged equidistantly above the guiding element by an amount between 0.1 mm and 5 mm and wherein the other area is an area which comprises the line of intersection between the first sheet section and the vertical erected sheet section according to above step k), wherein this plane is inclined relatively to the vertical erected sheet section along the transporting direction by an angle, preferably by 45°, to the inner of the bowl-shaped structure.

An alternative solution suggests that the lateral sheet sections which are fed at both sides are glued with the first sheet section.

In the region in transporting direction behind the concave formed section of the guiding element the support for the first sheet section is preferably formed by a revolving band. Thereby, it is possible that the flat section of the guiding element which follows the concave formed section is formed by the revolving band; the flat section refers thus primary on the functionality, not on the one-piece design with the guiding element.

The folded, flat, sheet-shaped substrate of the parallel further sheet sections as well as the sections of the first sheet section which are arranged between those sheet sections and the revolving band are preferably pressed onto the revolving band by means of rolls so that a sufficient friction is created between the revolving band and the substrate, to convey the sheet-like substrate synchronous with the revolving band.

An improved handling of the flat, flexible substrate can be obtained when according to a further development the first sheet section of the flat, flexible material is held by a vacuum on the surface of the guiding element in the region of the concave formed section of the guiding element.

In the case of bloc foam applications, in which often heights of the blocks of more than one meter is reached, normally a further separation sheet then supplied additionally from the side which serves as a separation sheet between the bloc and the side walls. But it is also possible that the above mentioned lateral sheet sections are so wide respectively high that the same serve already as lateral separation sheet for the whole height of the bloc.

So, from the two lateral sheet sections, i.e. from the separation sheets, in synergy with the first sheet section a bowl for the reactive mixture is created which is moved continuously in transporting direction, wherein this bowl is delimited against the transporting direction by the first sheet section and transverse to the transporting direction (production direction) by the two lateral sheet sections.

An important and supporting role has, as the case may be in this connection, the transporting and folding concept of the flat and flexible separation sheets between which the reactive mixture reacts to an endless string.

It is a benefit of the proposed method that it is possible by the method at the same time that by means of the continuous conveyed sheet sections a lateral barrier for the reactive mixture is created in that the lateral sheet sections are folded at the sides upwards as well as a barrier is created against a flow back of the reactive mixture against the transporting direction.

Thereby, at the one hand the first sheet section and the further lateral sheet sections can be originally separated sheets, but at the other hand it can be one single linked sheet which is divided into a central region and two outer regions be a respective folding.

It is an important benefit of the proposed method that it allows a crease-resistant folding of the separation sheets, even in the case of the use of paper which must be folded very exactly due to its low stretchability to avoid wrinkling or ripping.

This becomes possible by the fact that the deformation of the lateral sheet sections according to the invention is carried out in that region in which the substrate is guided across a concave formed ground. At the same time this folding concept allows the creation of a faced bowl with separation sheets moving continuously against the transporting direction at the sides. This constitutes an important benefit against for example the production method in which the reactive mixture foams at first in a hutch and is applied subsequently onto a conveyor band, because this cannot be faced with continuously moving separation sheets and consequently material is setting out at the walls of the hutch and adheres there during the production time.

The crease-resistant setting on edge of the outer sheet sections becomes possible by a special beneficial embodiment of the method in which the geometrical position of the in transporting direction left deforming edge for said deformation of the left sheet section seen in transporting direction in the region of the concaved formed ground facing the substrate results as the geometrical cut contour of two areas, wherein the first area is arched in transporting direction and is straight transverse to the transporting direction which is defined by the fact that it runs by an amount of 0.1 to 5 mm offset in the height (parallel) to the surface of the concave formed ground facing the substrate and wherein the second area is a plane which result by the fact that the plane of the laterally rising sheet section is clockwise swivelled by 45° around the cut contour of the left sheet section with the central sheet section. Of course, also a respective deformation of the right deforming edge seen in transporting direction is provided.

The lateral substrate sections which are already set on edge can be guided very good by the concave shape in the region of the concave form for example with help of moving rolls or cylinders but also with the help of stationary elements under which the lateral sheet sections can be pulled which are not coated and which run parallel to the first sheet section.

In a preferred embodiment of the method this is supported by the application of a vacuum in the concave form element, especially also to guide the first centre sheet section securely supported across the concave form of the ground facing the substrate. It was found that an underpressure of less than 300 mbar is absolutely sufficient for this purpose.

Therefore, the proposed folding concept allows especially the creation of a completely faced retaining bowl with moved sheets in interaction with a further substrate.

Accordingly, the method according to the invention can be carried out in a further preferred embodiment in such a manner that a further continuously moved, flat and track-like separating cover sheet (cover substrate) is coated with the polyurethane reactive mixture, that the polyurethane reactive mixture raises between this two substrates under chemical or physical gas formation in the so-called raising zone, wherein the first sheet section (bottom substrate) runs substantially below and the separating cover sheet runs substantially above the raising polyurethane reactive mixture, and wherein subsequently the polyurethane reactive mixture reacts to an endless string of cellular material.

This allows that the method is carried out according to a further beneficial embodiment so that the polyurethane reactive mixture flows through the outlet opening into the bank up chamber after discharge into the environmental atmosphere, which bank up chamber extends in vertical direction and which is closed laterally and flows in the region of the bottom in a gap opening, that the polyurethane reactive mixture is backed up in the bank up chamber so that at the bottom of the bank up chamber a static pressure is created along the whole width and the polyurethane reactive mixture flows through the bank chamber from the top to the bottom, and that subsequently the polyurethane reactive mixture flows out through the gap opening from the bank up chamber.

With reference to this reference is made explicitly to DE 2006 051 311 A1 where such a partial method is already described by which a continuous production of bloc soft foam is possible at very low transportation speed in the region from 0.5 to 3 m/min.

It is the benefit of this method that the length of the facility is very short compared with conventional bloc foam facilities by which the investment costs can be substantially reduced not only with respect to the facility itself but particularly also with respect to the buildings. This is valid especially with respect to the fact that bloc foam facilities are often badly utilised because the production speeds are significantly higher than necessary due to the method.

Therefore, the method according to the invention allows an optimized realization of the method as described in DE 10 2006 051 311 A1 which benefits are explained in detail in this document.

To guide the cover substrate sealed to the edge with the bottom substrate it is further proposed to design the method in such a manner that a further continuously moved, flat and track like separating cover sheet is coated with the polyurethane reactive mixture, that the polyurethane reactive mixture raises between those two separation sheets in the so-called raising zone under chemical or physical gas formation, wherein the first sheet section runs substantially below and the cover separation sheet runs substantially above the raising polyurethane reactive mixture and wherein subsequently the polyurethane reactive mixture reacts to an endless string of cellular material.

For the optimized implementation of the method for the continuous production of bloc soft foam as described in DE 10 2006 051 311 A1 it is furthermore proposed that the polyurethane reactive mixture after the discharge into the environmental atmosphere through the outlet opening flows into a bank up chamber which extends in vertical direction and which is closed laterally and which flows in the bottom region in a gap opening, that the polyurethane reactive mixture is backed-up in the bank up chamber so that a static pressure is created in the bottom of the bank up chamber along the whole width and the polyurethane reactive mixture flows through the bank up chamber from the top to the bottom, and that subsequently the polyurethane reactive mixture flows out through the gap opening from the bank up chamber.

By this a method is available which allows to produce also high blocs at very low transportation speeds and corresponding steep raising profiles. The advantages are in detail explained in DE 10 2006 051 311 A1.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 1 shows schematically in a perspective view a part of a device for the production of an endless string made of polyurethane reactive material at which a bowl-shaped reception structure for the reactive mixture is formed from a single material sheet.

FIG. 2 shows in the depiction according to FIG. 1 the device, wherein here lateral regions of a bowl-shaped structure are formed from separate material sheets.

FIG. 3 shows in a perspective view a detail of the device according to FIG. 1.

FIG. 4 shows in a perspective view a further detail of the device according to FIG. 1.

FIG. 5 shows schematically in a side view the device according to FIG. 1.

DETAILED DESCRIPTION OF THE INVENTION

In FIG. 1 a perspective view can be seen of a region of a device for the production of an endless string of polyurethane reactive plastic material, wherein a guiding element 2 made from sheet metal forms the ground facing the substrate (i.e. facing the reactive plastic material to be produced). This ground, i.e. the surface of the guiding element 2, has a concave formed section 3 at which a flat section 4 follows in transporting direction T. Specifically the ground consist at first of the guiding element 2 made of sheet metal and merges subsequently in a revolving transport band 5.

Also depicted is a continuously moved, track-like, central first sheet section $B_M$ which runs directly above the sheet metal 2 and the band 5.

Laterally and outwards two lateral sheet sections $B_L$ and $B_R$ are shown which are deformed in the region of the concave formed section 3 in such a manner that in cooperation with the first sheet section $B_M$ a bowl is created which is equipped with continuously moved separation sheets for the reactive mixture. This bowl is delimited against the transporting direction T by said first sheet section $B_M$; this is in turn delimited transverse to the transporting direction T by means of the two lateral sheet sections $B_L$ and $B_R$, wherein the first sheet section $B_M$ is connected in a sealed manner with the lateral sheet sections $B_L$ and $B_R$ so that no reactive mixture can leak into the surrounding atmosphere between those sheet sections.

Thereby, the first sheet section $B_M$ and the lateral sheet sections $B_L$ and $B_R$ can be at the one hand originally separate sheets (see FIG. 2 for this) or at the other hand a single connected sheet which was separated by a respective folding in a central and two outer regions. In FIG. 1 the case is depicted that a single sheet is used which is folded to the bowl respectively. After the deformation respectively folding the lateral sheet sections $B_L$ and $B_R$ consist here each of a left lateral sheet section $B_{L,perp}$ and a right lateral sheet section $B_{R,perp}$ which each are aligned perpendicular to the first sheet section $B_M$; furthermore a left parallel sheet section $B_{L,par}$ and a right parallel sheet section $B_{R,par}$ are existing which each are aligned parallel to the first sheet section $B_M$.

Normally, at bloc foam applications additionally a lateral separating sheet 7 is fed from the side which serves as separation sheet between the bloc and the side wall. This is shown in FIG. 1 (due illustration reasons only on the left side).

It is also possible that the lateral sheet sections $B_L$ and $B_R$ are so wide respectively so high that they by themselves already serve as lateral separation substrate for the whole height of the bloc. This is specifically possible for applications in which only small heights of the foam are reached (e. g. less than 300 mm).

In FIG. 2 a variation to FIG. 1 is shown. Here, a solution is shown at which the first sheet section $B_M$ and the lateral sheet sections $B_L$ and $B_R$ are designed at first separately, i.e. they are originally not connected with the first sheet section $B_M$. Furthermore, they are chosen so wide respectively high that they by themselves can already serve as lateral separation substrate for bloc heights above 1 m for the whole height of the bloc. So that no reactive mixture can leak between those lateral substrate sections and the first, central sheet section it is recommended to glue the in total three sheet section with another.

In FIG. 3 the in transporting direction right forming collar 8 for the deformation of the right sheet section $B_R$ is exemplarily depicted. Also, it can be seen how the forming collar 8 guides the outer part of the sheet section $B_M$ as well as the sheet section $B_{R,par}$. To completely and securely guide the sheet section $B_M$ directly on the guiding element 2 (ground sheet metal) it is recommended to use a vacuum in the concave formed section 3 of the guiding element 2 which is not further depicted.

Furthermore, in FIG. 3 a roll 6 (press roll) is shown exemplary by which a frictionally engagement between the substrate and the revolving band 5 can be obtained. Normally, between the roll 6 and the edged sheet section $B_{R,perp}$ the side wall and if applicable also a further lateral separation sheet (see FIG. 1) runs, which are however not shown in FIG. 3. The rolls 6 are pressed against the band 5 preferably by means of a spring or pneumatically with a defined force.

In FIG. 4 a deformation edge U for the deformation of the in transporting direction T right sheet section $B_R$ is exemplified depicted. The deformation edge U results from the cut contour of the plane E with an imaginary bent plane which runs directly above the guiding element 2 with the concave formed section 3 facing the substrate and parallel to the surface of the guiding element 2. The plane E results when the plane in which the sheet section $B_{R,perp}$ lies is swivelled by an angle α of 45° around the fold edge $K_{R0}$. Also the fold edge $K_{R0}$ is depicted which results from the above explained C-folding at which the lateral sheet sections $B_L$ and $B_R$ of the sheet section $B_M$ are at first folded by 180° inwardly. Analogue to the shown right hand side fold edges $K_R$ and $K_{R0}$ also corresponding left hand side folding edges $K_L$ and $K_{L0}$ exist which however are not shown.

In FIG. 5 a schematical side sectional view is shown in which the covering separating sheet 9, the outlet opening 10 of the mixer the bank up reservoir 11 as well as the gap opening 12 at the transition from the bank up reservoir to the rising zone 13 can be seen. The reactive mixture coats in this case at first the covering separating sheet 9, is retained in the bank up reservoir 11 by the gap opening 12 so that a static fluid pressure is created in the bank up reservoir 11 which then compensates the static pressure of the steep raising foam in the rising zone 13 so that the reactive mixture even at very low transporting speeds is not pressed against the transporting direction T.

While specific embodiments of the invention have been shown and described in detail to illustrate the inventive principles, it will be understood that the invention may be embodied otherwise without departing from such principles.

We claim:

1. A method for the continuous production of an endless string of polyurethane reactive plastic material, comprising the steps of:
   a) at first conveying reactive components polyol and isocyanate to a mixer in a metered manner;
   b) mixing the reactive components in the mixer to a reactive mixture;
   c) subsequently discharging the reactive mixture into environmental atmosphere;
   d) coating a first sheet section made from a planar, flexible material, which is conveyed continuously in a transporting direction, with the reactive mixture;
   e) guiding the first sheet section across a guiding element, which has a concave section and a flat section which follows the concave section in the transporting direction;
   f) feeding two lateral sheet sections to the first sheet section, wherein the feeding occurs into two lateral end sections of the first sheet section; and
   g) merging the two lateral sheet sections and the first sheet section so that the two lateral sheet sections extend upward from a surface of the first sheet section forming a structure for reception of the reactive mixture between the two lateral sheet sections, the two lateral sheet sections and the first sheet section being moved continuously in the transporting direction, wherein the first sheet section is connected with the lateral sheet sections in a sealed manner so that no reactive mixture leaks into the surrounding atmosphere between the sheet sections.

2. The method according to claim 1, wherein the merging of the two lateral sheet sections to the first sheet section occurs in a region of the concave section of the guiding element.

3. The method according to claim 2, wherein the first sheet section and the two lateral sheet sections are formed by folding of a single sheet section made of a planar material.

4. The method according to claim 3, wherein the method further comprises the steps of:
   h) unwinding a plane sheet of the material from a roll;
   i) carrying out a first and a second folding of the planar sheet wherein two lateral outer sections of the sheet are folded to an inner side by 180° so that a C-fold is created with a first fold edge between the first sheet section and a first of the lateral sheet sections and with a second fold edge between the first sheet section and a second of the lateral sheet sections;
   j) guiding the sheet which has the C-fold across the concave section of the guiding element; and
   k) edging the two lateral sheet sections which are folded to the inner side in the region of the concave section so that at least outer sections of the lateral sheet sections which are at first folded to the inner side by 180° are further folded so that at least the outer sections of the lateral sheet sections are erected vertically to the first sheet section to form the structure for the reception of the reactive mixture together with the first sheet section.

5. The method according to claim 4, wherein the lateral sheet sections after deforming according to step k) are formed in the region of the concave section in the region of the flat section of the guiding element so that each one of the sheet sections is aligned perpendicular to the first sheet section while a respective further sheet section is aligned parallel to the first sheet section.

6. The method according to claim 3, wherein the structure laterally delimited by the lateral sheet sections becomes wider when advancing in the transporting direction in the region of the concave section.

7. The method according to claim 4, wherein a geometrical position of a deformation edge for deformation of the C-fold according to step i) into the edged position according to step k) in the region of the concave section results as a geometrical section of two areas, wherein one of the areas is an area arranged equidistantly above the guiding element by an amount between 0.1 mm and 5 mm and wherein the other area is an area which comprises a line of intersection between the first sheet section and the vertical erected sheet section according to step k), to form a plane inclined relatively to the vertical erected sheet section along the transporting direction by an angle $\alpha$ to an interior of the bowl-shaped structure.

8. The method according to claim 7, wherein the angle $\alpha$ is 45°.

9. The method according to claim 1, wherein the lateral sheet sections are glued with the first sheet section.

10. The method according to claim 5, wherein in a region in the transporting direction behind the concave section of the guiding element, a support for the first sheet section is formed by a revolving band.

11. The method according to claim 10, wherein a folded, flat, sheet-shaped substrate of the parallel further sheet sections as well as sections of the first sheet section, which are arranged between the further sheet sections and the revolving band, are pressed onto the revolving band by rolls so that a sufficient friction is created between the revolving band and the substrate to convey the sheet-like substrate synchronously with the revolving band.

12. The method according to claim 1, including holding the first sheet section of the flat, flexible material by a vacuum on the surface of the guiding element in the region of the concave section of the guiding element.

* * * * *